US012090355B2

(12) United States Patent
Oldham

(10) Patent No.: US 12,090,355 B2
(45) Date of Patent: Sep. 17, 2024

(54) CONCEALED HORIZONTAL SIDEWALL SPRINKLER

(71) Applicant: The Viking Corporation, Hastings, MI (US)

(72) Inventor: Michael J. Oldham, Kalamazoo, MI (US)

(73) Assignee: The Viking Corporation, Caledonia, MI (US)

( * ) Notice: Subject to any disclaimer, the term of this patent is extended or adjusted under 35 U.S.C. 154(b) by 32 days.

(21) Appl. No.: 17/169,921

(22) Filed: Feb. 8, 2021

(65) Prior Publication Data

US 2021/0162249 A1 Jun. 3, 2021

Related U.S. Application Data

(63) Continuation of application No. 15/146,856, filed on May 4, 2016, now Pat. No. 10,940,347.

(51) Int. Cl.

*A62C 37/09* (2006.01)
*A62C 35/68* (2006.01)
*A62C 37/12* (2006.01)
*B05B 1/26* (2006.01)

(52) U.S. Cl.

CPC .............. *A62C 35/68* (2013.01); *A62C 37/09* (2013.01); *A62C 37/12* (2013.01); *B05B 1/267* (2013.01)

(58) Field of Classification Search

CPC ... A62C 37/09; A62C 37/10-14; A62C 35/68; B05B 1/267

See application file for complete search history.

(56) References Cited

U.S. PATENT DOCUMENTS

| | | | | | |
|---|---|---|---|---|---|
| 2,005,600 | A * | 6/1935 | Tappen | B05B 1/265 | 239/500 |
| 2,135,138 | A * | 11/1938 | Kendall | B05B 1/265 | 239/DIG. 1 |
| 2,448,472 | A * | 8/1948 | Schott | A62C 31/02 | 239/500 |
| 2,732,018 | A | 1/1956 | Grimes | | |
| 3,768,736 | A | 10/1973 | Cox | | |
| 3,783,947 | A * | 1/1974 | Dix | A62C 37/12 | 169/42 |
| 4,066,129 | A | 1/1978 | Anderson | | |
| 4,091,873 | A * | 5/1978 | Werner | B05B 1/265 | 169/37 |
| 4,113,021 | A | 9/1978 | Werner | | |

(Continued)

OTHER PUBLICATIONS

European Search Report dated Oct. 24, 2019 (corresponding to EP17792963.5).

(Continued)

*Primary Examiner* — Joseph A Greenlund

(74) *Attorney, Agent, or Firm* — Perkins Coie LLP

(57) ABSTRACT

A concealed sprinkler includes a sprinkler body having a flow passage therethrough with an inlet end and an outlet end. A closure device is secured at the outlet end of the flow passage by a heat responsive trigger. A deflector assembly includes a deflector plate and a button secured to an upstream side of the deflector plate. The deflector assembly is movably supported to the sprinkler body by at least one arm. The button defines an aperture that extends unobstructed all the way through the button from an upstream side to a downstream side.

10 Claims, 6 Drawing Sheets

(56) References Cited

U.S. PATENT DOCUMENTS 4,580,729 A * 4/1986 Pounder ................. A62C 37/12 239/524
4,651,832 A * 3/1987 Kubo ..................... A62C 37/10 169/42
4,880,063 A * 11/1989 Leininger .............. A62C 37/12 169/37
5,372,203 A * 12/1994 Galaszewski .......... A62C 37/14 169/37
5,497,834 A * 3/1996 Onuki .................... A62C 37/12 169/37
5,727,737 A * 3/1998 Bosio ..................... A62C 31/02 169/37
5,829,532 A * 11/1998 Meyer .................... A62C 37/11 169/37
5,865,256 A * 2/1999 Pounder ................. A62C 37/14 169/37
6,044,912 A * 4/2000 Tsuji ...................... A62C 37/12 169/42
6,123,153 A 9/2000 Finnegan
6,129,153 A * 10/2000 Joung .................... A62C 31/02 169/41
6,152,236 A * 11/2000 Retzloff ................. A62C 37/14 169/56
6,336,509 B1 1/2002 Polan et al.
6,367,559 B1 * 4/2002 Winebrenner ......... A62C 37/11 239/524
6,374,919 B1 * 4/2002 Neill ...................... A62C 37/09 169/41
6,520,265 B2 * 2/2003 Winebrenner ......... A62C 31/02 169/59
6,840,329 B2 * 1/2005 Kikuchi ................. A62C 37/09 169/56
6,854,668 B2 * 2/2005 Wancho ................. A62C 37/14 239/524
7,137,455 B2 * 11/2006 Green .................... A62C 31/02 239/524
7,143,834 B2 * 12/2006 Dolan .................... A62C 37/11 137/79
7,222,678 B2 * 5/2007 Shim ...................... A62C 37/09 169/59
7,257,603 B2 8/2007 Murman et al.
7,275,603 B2 * 10/2007 Polan ..................... A62C 37/09 169/41
7,353,882 B2 * 4/2008 Pahila .................... A62C 37/14 169/41
7,543,654 B2 * 6/2009 Koiwa ................... A62C 37/09 169/41
7,735,569 B2 6/2010 Green
7,784,555 B2 * 8/2010 Pahila .................... A62C 37/14 169/42
7,921,928 B2 * 4/2011 Thompson ............. A62C 37/11 169/17
8,151,897 B1 * 4/2012 Meyer .................... A62C 37/08 239/524
8,176,987 B2 * 5/2012 Rekeny ................... F16F 1/025 169/57
D663,009 S 7/2012 Koiwa
8,353,356 B2 * 1/2013 Rogers ................... A62C 37/09 239/524
8,387,711 B2 * 3/2013 Cordell .................. A62C 35/68 169/17
8,646,539 B2 * 2/2014 Abels ..................... A62C 37/11 169/42
8,662,190 B2 * 3/2014 Watson .................. A62C 31/02 239/524
8,662,191 B2 * 3/2014 Orr ........................ A62C 35/68 169/17
8,776,903 B2 * 7/2014 Jimenez ................. A62C 37/12 169/41
9,027,660 B2 * 5/2015 Oldham .................. B05B 15/14 169/37
9,089,729 B2 * 7/2015 Almeida ................. B05B 1/265
9,114,267 B2 8/2015 VanEerden et al.
9,132,305 B2 * 9/2015 Feenstra ................ A62C 35/68
9,265,981 B2 * 2/2016 Orr ........................ A62C 37/14
9,320,929 B2 * 4/2016 Koiwa ................... A62C 35/68
9,320,930 B2 * 4/2016 Abels ..................... A62C 37/08
9,339,675 B2 * 5/2016 Koiwa ................... A62C 37/08
9,452,305 B2 * 9/2016 De Vries ................ A62C 37/12
9,630,039 B2 * 4/2017 Koiwa .................... B25B 13/02
9,782,614 B2 * 10/2017 Chen ...................... A62C 35/68
9,931,528 B2 * 4/2018 Abels ..................... A62C 37/12
9,974,989 B2 * 5/2018 Abels ..................... A62C 31/02
10,046,190 B2 * 8/2018 Polan ..................... A62C 37/12
2002/0056763 A1 5/2002 Winebrenner
2003/0079889 A1 * 5/2003 Meyer .................... A62C 37/11 169/41
2006/0102362 A1 * 5/2006 S. Polan ................ A62C 37/09 169/37
2008/0257564 A1 * 10/2008 Cordell .................. A62C 35/62 169/17
2009/0056958 A1 * 3/2009 Polan ..................... A62C 37/12 169/37
2009/0218109 A1 * 9/2009 Sato ....................... A62C 31/02 169/37
2009/0255693 A1 * 10/2009 Sato ....................... A62C 31/02 169/37
2010/0263883 A1 * 10/2010 Abels ..................... A62C 31/02 169/37
2011/0315406 A1 * 12/2011 Connery ............ A62C 99/0072 169/37
2012/0261498 A1 * 10/2012 Kameishi ............... A62C 37/12 239/583
2012/0267125 A1 * 10/2012 Abels ..................... A62C 37/08 169/41
2013/0284463 A1 10/2013 Multer et al.
2013/0341054 A1 12/2013 Polan et al.
2014/0076585 A1 * 3/2014 Abels ...................... B05B 12/08 169/37
2014/0216769 A1 8/2014 Almeida et al.
2015/0083442 A1 * 3/2015 Koiwa ................... A62C 35/68 169/37
2015/0246252 A1 * 9/2015 Ancone ................... B05B 1/265 169/37
2016/0121150 A1 * 5/2016 Penden ................... B05B 1/265 169/37

OTHER PUBLICATIONS

Canadian Office Action dated Feb. 27, 2020 (corresponding to CA3018948).

* cited by examiner

CONCEALED HORIZONTAL SIDEWALL SPRINKLER

CROSS-REFERENCE TO RELATED APPLICATION(S)

This application is a continuation application of U.S. patent application Ser. No. 15/146,856, filed May 4, 2016. The entire disclosure of the above application is incorporated herein by reference.

FIELD

The present disclosure relates to a sprinkler assembly and, more particularly, to a concealed horizontal sprinkler assembly for use in a side wall mount.

BACKGROUND

This section provides background information related to the present disclosure which is not necessarily prior art.

Automatic sprinklers are well known and have long been used in fire extinguishing systems. Typically, automatic sprinkler assemblies include a sprinkler body which includes an inlet for connecting to a pressurized supply of water or other fire extinguishing fluid, an outlet opening, and a deflector which is mounted spaced from the outlet opening of the sprinkler body. The deflector disperses and directs the water in an optimum pattern when the water is discharged through the outlet opening. In one common form, the deflector is mounted in a fixed position and spaced from the outlet opening by a frame. The frame includes a pair of arms, which attach to either side of the sprinkler body, and aligns the deflector with the path of the water when it is discharged through the outlet opening. The outlet opening is normally closed by a closure seal which is held in place typically by a trigger element, such as a glass bulb or a fusible link element. The trigger element extends between the seal and the frame and is usually held in place by a set screw or the like.

Other forms of sprinkler assemblies include flush sprinkler assemblies. Flush sprinkler assemblies include a housing and a deflector which is recessed within the housing. The deflector is movably mounted to the sprinkler body by a pair of guide members and moves between a closed position in which the deflector is recessed within the housing and an extended position wherein the deflector projects from the housing and is spaced from the outlet opening of the sprinkler body. Similar to a fixed sprinkler assembly, a flush sprinkler assembly includes a thermally responsive trigger mechanism and a fluid seal. In a flush sprinkler, the fluid seal is positioned within the interior of the sprinkler body. The fluid seal is secured by a trigger mechanism. Thus, under normal operating conditions, the trigger mechanism prohibits fluid flow from the outlet of sprinkler body. When the temperature rises to a preselected value, the trigger mechanism, which is normally a fusible link, separates permitting the pins to move in an outward direction under the pressure of the water. With the separation of the fusible link, the pressure in the water supply line pushes the fluid seal away from the outlet opening and the deflector to its outward position thereby enabling the water to travel through the sprinkler body and to be dispersed by the deflector.

In side wall mounted sprinklers, the orientation of the assembly causes the pressurized water to disperse in a horizontal direction. There is a need for an automatic side wall sprinkler assembly which exhibits an optimized spray pattern. Sidewall sprinklers typically include a deflector with a solid central portion with tines extending from the central portion and a blade that is positioned above the central portion. When the fluid flows from the discharge opening of the base, the fluid impinges on the boss and on the central portion of the deflector. The boss and deflector disperse the fluid radially outward, and the fluid is thereafter further dispersed by the tines, and in the case of the sidewall sprinklers also by the blade. The boss and the solid central portion of the deflector inhibit the fluid flow in a direction directly forward of the horizontal sprinkler.

SUMMARY

This section provides a general summary of the disclosure, and is not a comprehensive disclosure of its full scope or all of its features.

A concealed sprinkler includes a sprinkler body having a flow passage therethrough with an inlet end and an outlet end. A closure device is secured at the outlet end of the flow passage by a heat responsive trigger. A deflector assembly includes a deflector plate and a button secured to an upstream side of the deflector plate. The deflector assembly is movably supported to the sprinkler body by at least one arm. The button defines an aperture that extends unobstructed all the way through the button from an upstream side to a downstream side.

The aperture through the button can be cylindrical, tapered, elongated in an either lateral or vertical direction or otherwise shaped to provide a desired flow pattern. The aperture can also be sloped in a desired upward or downward direction and/or divided into multiple flow paths.

According to a further aspect of the present disclosure, the deflector plate includes a central portion defining an aperture for receiving the button. A plurality of tines extends from a lower periphery of the deflector plate when assembled in its horizontal orientation and a canopy is supported above the central portion by a single central support portion extending radially upward from the central portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
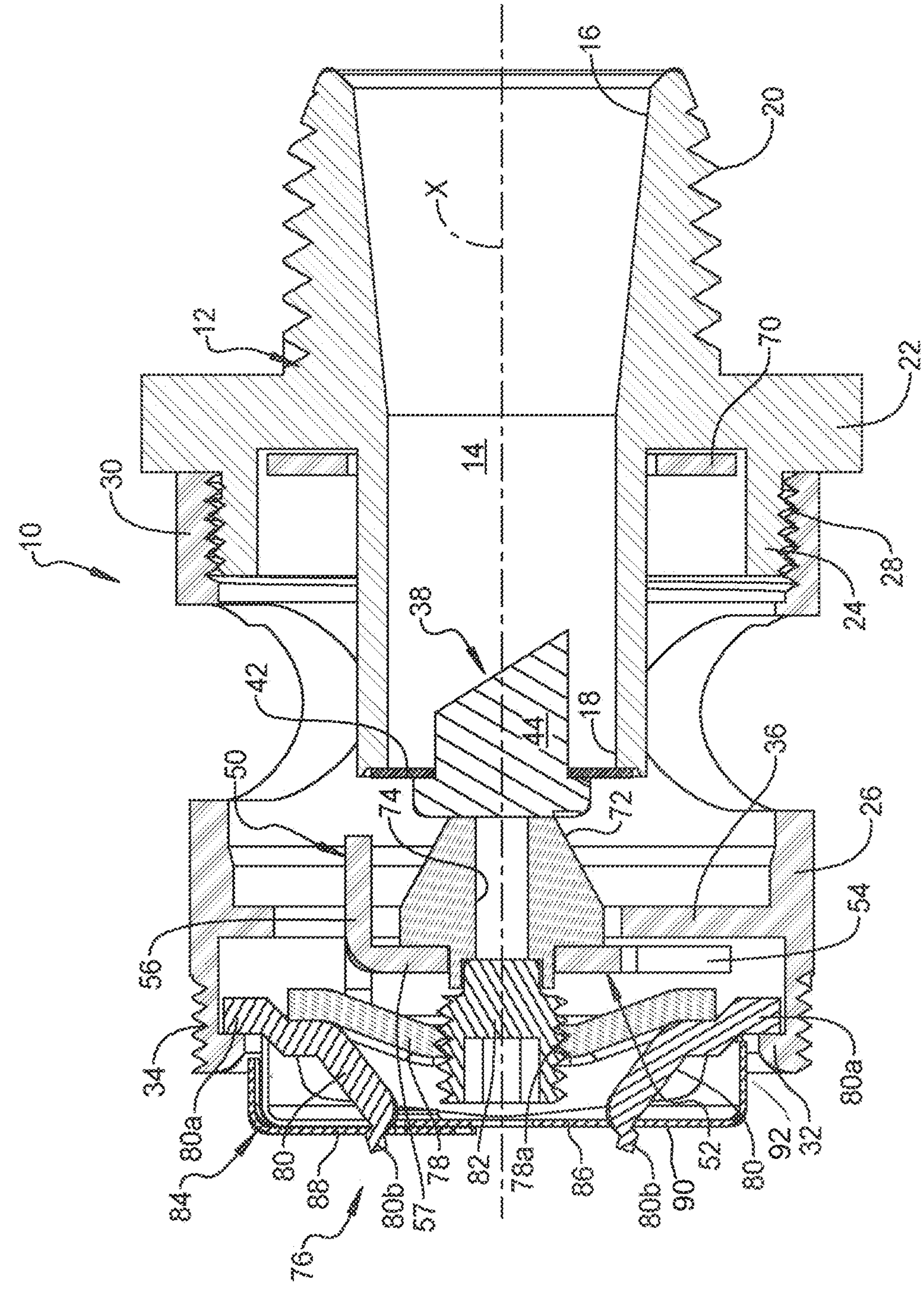
FIG. 1 is a cross-sectional view of the concealed horizontal sidewall sprinkler according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a cross-sectional view of a concealed horizontal sidewall sprinkler 10 is shown. The sprinkler 10 includes a body 12 that defines a flow passage 14 therethrough with an inlet end 16 and an outlet end 18. The body 12 can include a threaded connection 20 at the inlet end 16 for connection to a water distribution pipe system (not shown). The body 12 can also include a radially outwardly extending flange portion 22 and an axially extending externally threaded portion 24 extending from the flange 22.

A housing 26 can include internal threads 28 at a proximal end 30 that engage the externally threaded portion 24. The housing 26 further includes an inner shoulder 32 at a distal end 34. The housing 26 also includes an intermediate internal flange 36 disposed between the proximal and distal ends 30, 34.

A closure device 38 is secured at the outlet end 18 of the flow passage 14. The closure device 38 can include a spring plate 42 and seat 44 that sealingly close off the outlet end 18 of the flow passage 14.

Figure 2:
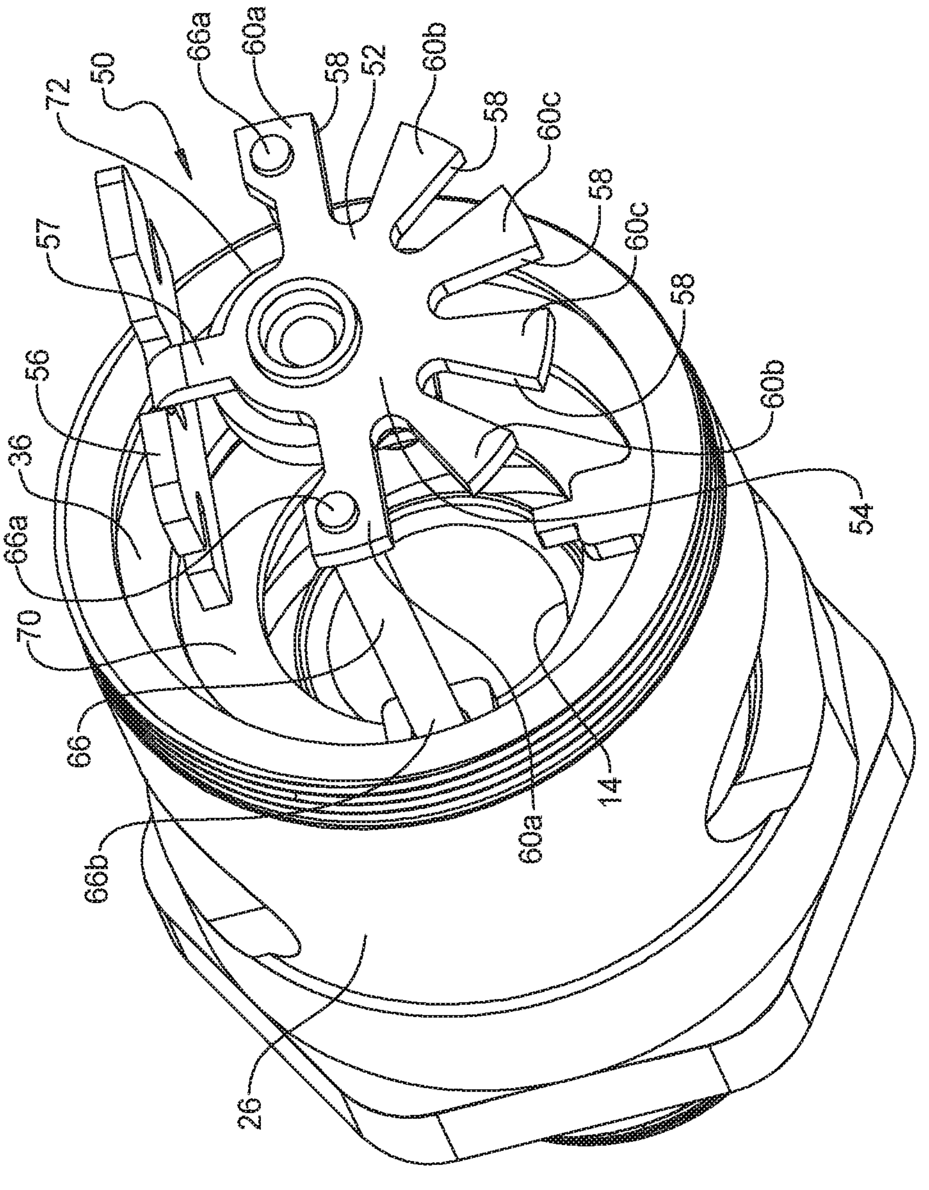
FIG. 2 is a perspective view of the concealed horizontal sidewall sprinkler with the deflector assembly in an extended activated position according to the principles of the present disclosure.
Figure 3:
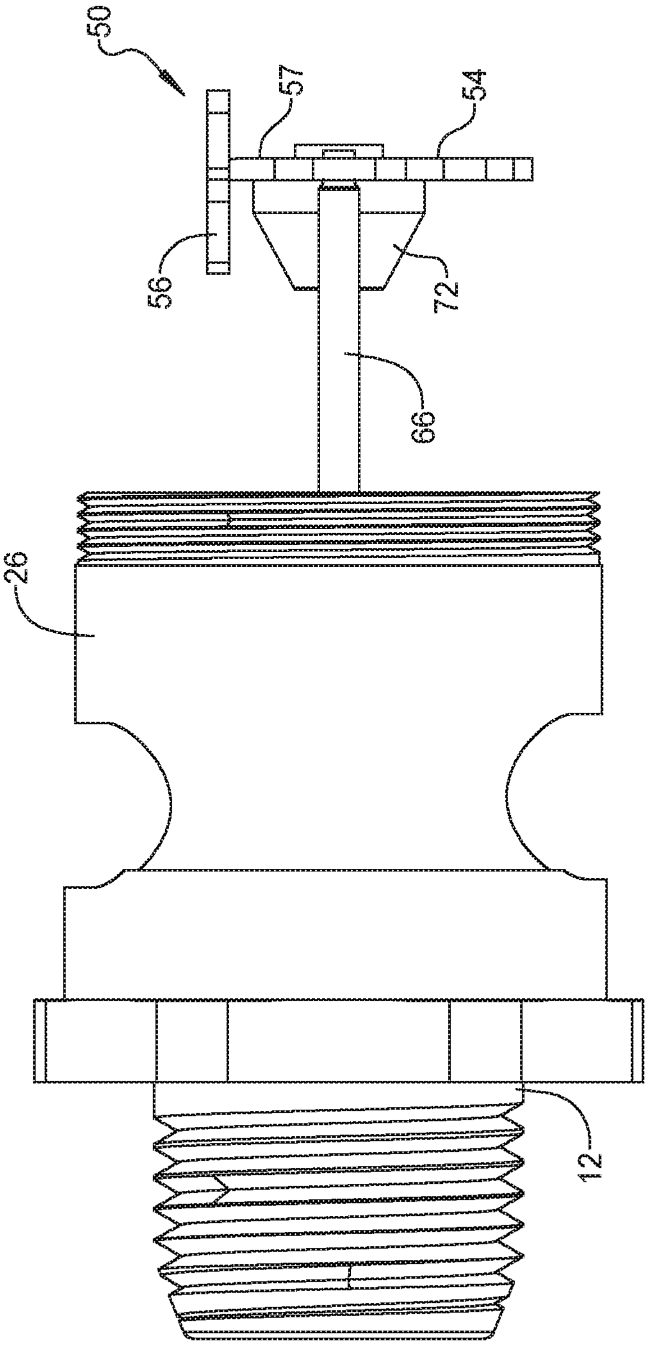
FIG. 3 is a side plan view of the concealed horizontal sidewall sprinkler with the deflector assembly in an extended activated position according to the principles of the present disclosure.
Figure 11:
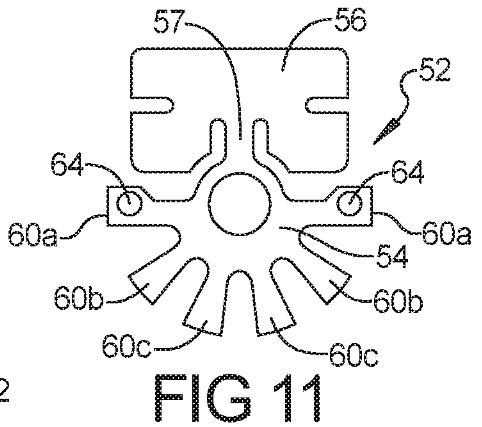
FIG. 11 is a plan view of a deflector plate stamping according to the principles of the present disclosure.

A deflector assembly 50 is movable from a first retracted position (shown in FIG. 1) to a second extended position (shown in FIGS. 2 and 3). With reference to FIGS. 2 and 3, the deflector assembly 50 can include a deflector plate 52 that is made from a single stamping as shown in FIG. 11 (shown in a blanked condition) and having a central portion 54 that is generally orthogonal to a center axis X of the flow passage 14. The deflector plate 52 can also include a canopy portion 56 that is supported generally perpendicular to the central portion 54 by a single central support portion 57 that extends from the central portion 54. The central portion 54 can include a plurality of slots 58 extending radially inward from an outer periphery thereof to define a plurality of radially outwardly projecting tines 60*a*-60*c*. The deflector plate 52 can include a pair of oppositely directed tines 60*a* that each include an aperture 64 there through for engagement by a distal end 66*a* of a pair of support pins 66 that generally lie on a horizontal plane that passes through the center axis X of the flow passage 14 in an assembled horizontal sidewall orientation (as shown in FIG. 3). The pair of support pins 66 each include a proximal end 66*b* that engage an alignment ring 70. In the first retracted position of the deflector assembly 50, the alignment ring 70 is generally disposed against the flange portion 22 and within the externally threaded portion 24 of the body 12 (as shown in FIG. 1). In the second extended position shown in FIGS. 2 and 3, the alignment ring 70 engages the intermediate internal flange 36 of the housing 26.

Figure 5:
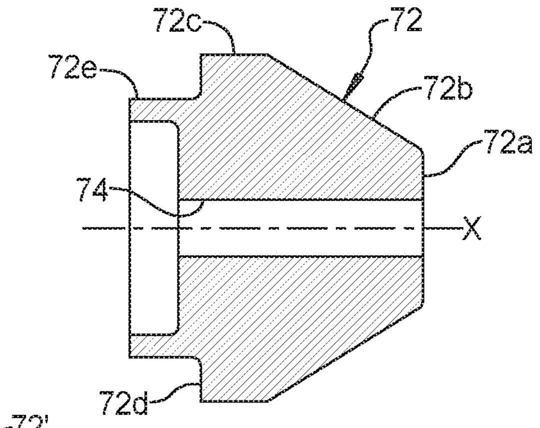
FIG. 5 is a cross-sectional view of a deflector button according to the principles of the present disclosure.

The deflector assembly 50 also includes a projection button 72 (FIGS. 1 and 5) secured to an upstream side of the central portion 54 of the deflector plate 52. The button 72 includes a proximal face 72*a* that can be generally orthogonal to the axis X of the flow passage 14 and a generally conically shaped sidewall portion 72*b* extending from the proximal face 72*a*. It generally cylindrical sidewall portion 72*c* extends from the conically shaped sidewall portion 72*b*. A distal end of the button 72 includes a downstream facing face portion 72*d* that is disposed directly against the first portion 54 of the deflector plate 52. A downstream extending flange portion 72*e* extends axially from the face portion 72*d* and is received in an aperture in the first portion 54 of the deflector plate 52. An aperture 74 extends all the way through the button 72 from the proximal face 72*a* through to the distal end of the button 72. The aperture 74 is generally aligned with the axis X of the flow passage 14. As shown in FIG. 3, the aperture 74 in the button 72 can include a cylindrical sidewall.

Figure 6:
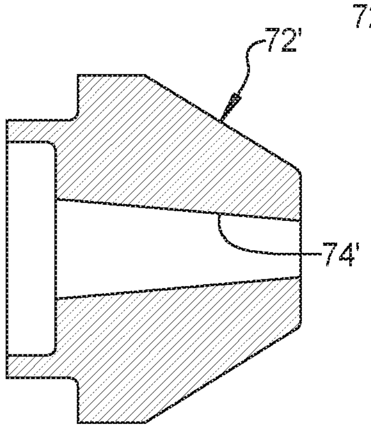
FIG. 6 is a cross-sectional view of an alternative deflector button according to the principles of the present disclosure.
Figure 7:
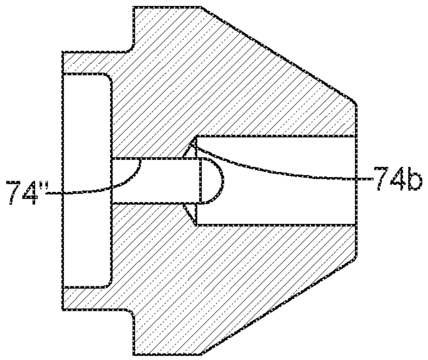
FIG. 7 is a cross-sectional view of a further alternative deflector button according to the principles of the present disclosure.
Figure 9:
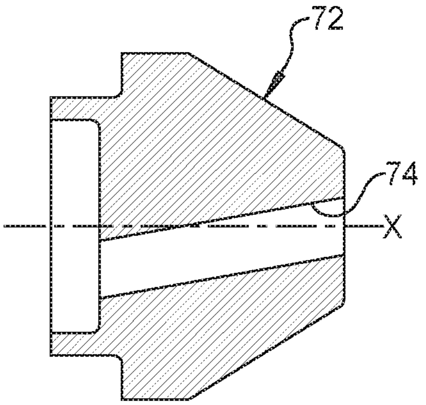
FIG. 9 is a cross sectional view of a further alternative deflector button according to the principles of the present disclosure.
Figure 10:
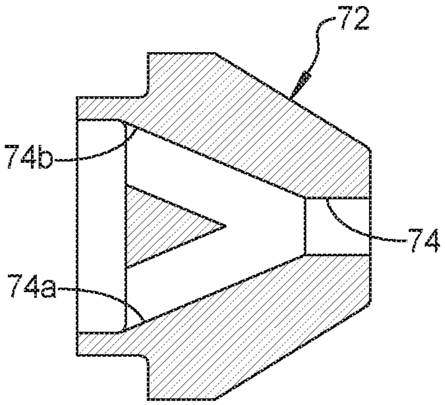
FIG. 10 is a cross sectional view of a further alternative deflector button according to the principles of the present disclosure.
Figure 8:
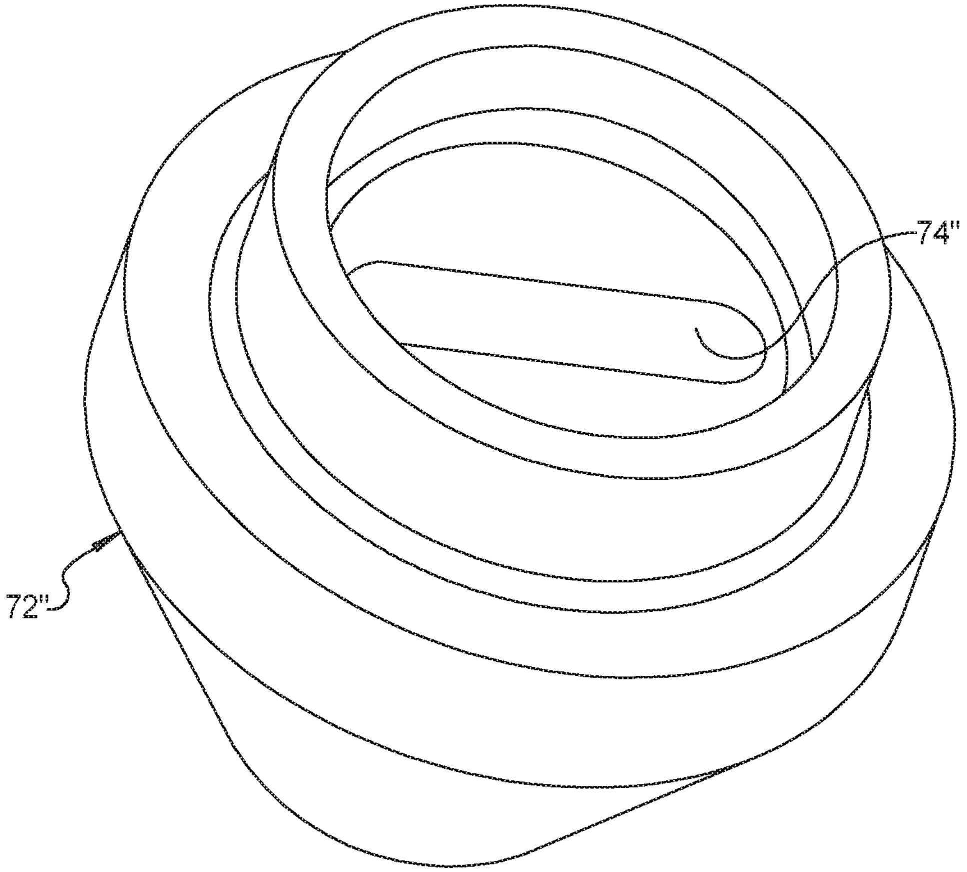
FIG. 8 is a perspective view of a distal end of the deflector button of FIG. 6.

Alternatively, as shown in FIG. 6, the aperture 74' in the button 72' can be tapered so as to be conical in shape. It should be understood that the tapering of the aperture can be tapering inward or outward from the proximal to the distal end. As a still further alternative, the distal end of the aperture 74" can be elongated in a lateral direction (best shown in FIG. 8) or a vertical direction as desired, as illustrated in FIGS. 7 and 8. The shape of the proximal end of the aperture 74" can differ from the elongated distal end relative to the direction of flow through the sprinkler 10. The proximal end of the aperture 74" can include a conically inwardly tapering intermediate surface 74*b* that “funnels” the water from the proximal end into the elongated distal end of the aperture 74". It should be understood that the shape of the aperture can be varied to provide a desired flow through the button. With reference to FIG. 9, the aperture 74 can be angled to direct the flow of fluid in a downward or upward direction relative to the axis X, as desired. In addition, as shown in FIG. 10, the aperture 74 can be split into multiple flow paths 74*a*, 74*b*, as desired to provide flow paths leaving the button 72.

Figure 4:
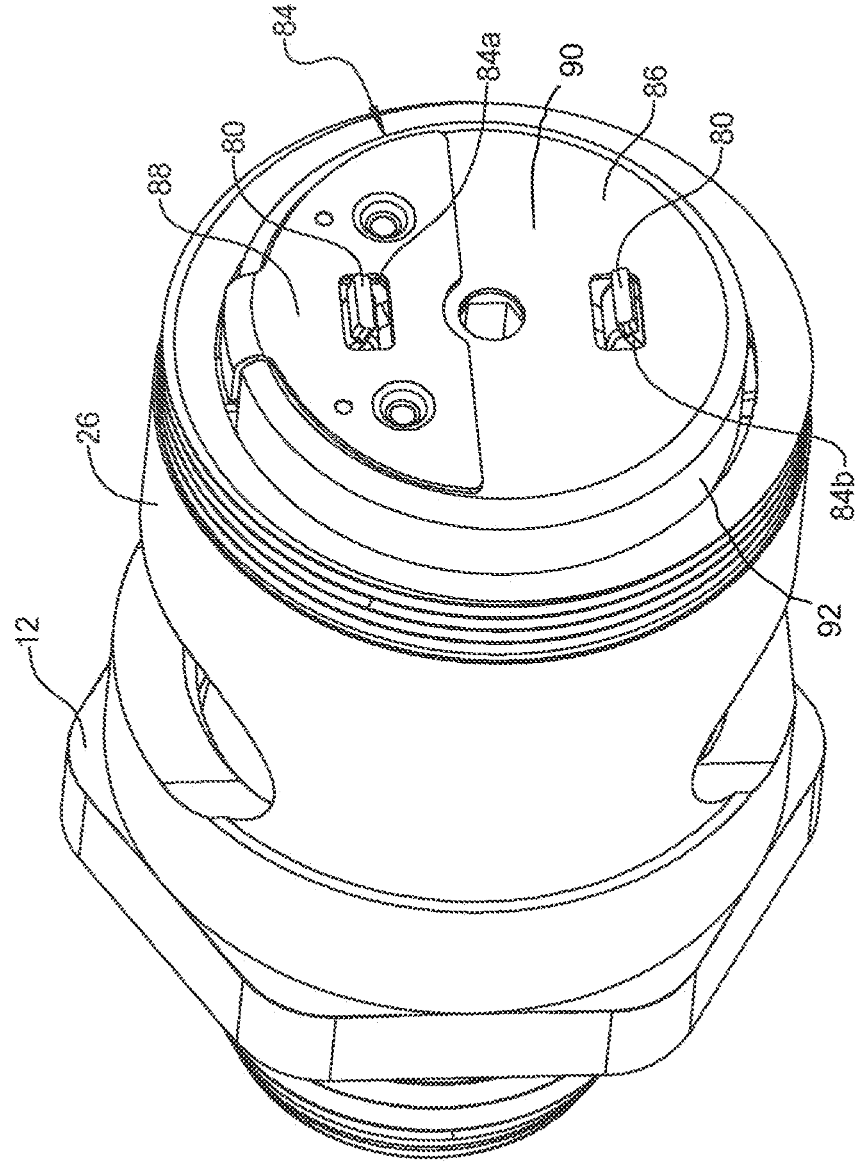
FIG. 4 is a perspective view of the concealed horizontal sidewall sprinkler in a fully assembled, un-activated condition according to the principles of the present disclosure.

A heat responsive trigger device 76 is provided for securing the closure device 38 over the outlet end 18 of the flow passage 14, as best shown in FIGS. 1 and 4. The heat responsive trigger device 76 can include a lever bar 78, a pair of levers 80, a set screw 82 and a soldered element assembly 84. The set screw 82 is threadedly received in a threaded aperture 78*a* in the lever bar 78. A set screw 82 is disposed against the distal end of the button 72 and biases the button 72 against the closure device 38. The pair of levers 80 each include a first end 80*a* received under the inner shoulder 32 of the housing 26 and include a second end 80*b* received within a pair of apertures 84*a*, 84*b* in the soldered element assembly. The soldered element assembly 84 can include a bottom element 86 and a top element 88 that are soldered together (by a solder designed to melt at a desired temperature) to combine to form the pair of apertures 84*a*, 84*b*. The top element 88 and bottom element 86 of the solder element assembly 84 define a terminal wall 90 and a peripheral wall 92 contiguous the terminal wall 90. The terminal wall 90 is disposed transverse, and, preferably, perpendicular to the center axis X. The peripheral wall 92 extends from a contiguous connection with the terminal wall 90 along the center axis X toward the deflector assembly 50. The peripheral wall 92 is also disposed about the pair of levers 80 and at least partially located within the housing 26. The peripheral wall 92 extends within the housing 26 adjacent the inner shoulder 32 of the housing 26 and forms an air gap between the inner shoulder 32 and an outer surface of the peripheral wall 92. In a preferred embodiment, the peripheral wall 92 is disposed about the pair of levers 80 so that an annular air gap is formed between the inner shoulder 32 and outer surface of the peripheral wall 92.

The concealed horizontal sidewall sprinkler 10 is designed to be mounted horizontally in a sidewall. In operation, when a fire condition exists, heat from the fire will cause the solder of the soldered element assembly 84 to release the bond between the bottom element 86 and top element 88. As the soldered element assembly 84 becomes disconnected, the levers 80 release their engagement with the lever bar 78. As the lever bar 78 falls away, the set screw 82 also falls away from the deflector assembly 52 so that the pressure against the closure device 38 is relieved. As the pressure against the closure device 38 is relieved, the closure device 38 falls away and the internal pressure of water within the flow passage 14 flows against the deflector assembly 52 causing the deflector assembly 52 to deploy to the extended position as illustrated in FIGS. 2 and 3. Water flowing through the flow passage 14 strikes the button 72 and deflector plate 52 so that water is distributed by the deflector assembly 50. The aperture 74 in the button 72 allows water to flow directly through the button so that the distribution water can be controlled in a direction that is directly outward from the horizontal sidewall sprinkler 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A concealed sprinkler, comprising:

a sprinkler body having a flow passage therethrough with an inlet end and an outlet end disposed along a center axis;

a closure device secured at the outlet end of the flow passage by a heat responsive trigger;

a housing surrounding the closure device;

a deflector assembly disposed within the housing, the deflector assembly including a deflector plate and a button secured to the deflector plate, said deflector assembly being movably supported relative to the sprinkler body by at least one pin, wherein the heat responsive trigger includes a soldered element assembly and a pair of levers that each engage an inner shoulder of the housing and an aperture of the soldered element assembly, the inner shoulder defining a distal opening of the housing, the distal opening having an opening width transverse the center axis, wherein the soldered element assembly comprises a terminal wall transverse to the center axis and a peripheral wall contiguous the terminal wall, the peripheral wall being disposed along the center axis toward the deflector assembly and about the pair of levers, the peripheral wall defining a soldered element assembly width transverse the center axis less than the opening width of the distal opening, wherein the peripheral wall extends at least partially within at least a portion of the housing and forms an air gap between an inner shoulder of the housing and an outer surface of the peripheral wall so that the air gap provides air flow from an environment external to the housing into an interior of the housing, wherein the air gap extends along the center axis, and wherein the air gap comprises a single annular air gap disposed between the inner shoulder of the housing and about a circumference of the outer surface of the peripheral wall so that an entirety of the peripheral wall is spaced from the housing and a terminal end of the peripheral wall is freestanding within the housing;

wherein the terminal end of the peripheral wall is located between the inner shoulder and the deflector assembly.

2. The concealed sprinkler according to claim 1, wherein said button includes a flange portion that is staked within an aperture in the deflector plate.

3. The concealed sprinkler according to claim 1, wherein said deflector plate includes a plurality of slots extending inward from a periphery thereof.

4. The concealed sprinkler according to claim 3, wherein said plurality of slots are disposed within a planar portion that is perpendicular to the center axis, and wherein the deflector further includes a canopy portion that is parallel to the center axis.

5. The concealed sprinkler according to claim 1, wherein said button defines an aperture that extends unobstructed all the way through the button from an upstream side to a downstream side of the deflector plate, and wherein the aperture in the button is disposed along the center axis of the flow passage.

6. The concealed sprinkler according to claim 1, wherein said button defines an aperture that extends unobstructed all the way through the button from an upstream side to a downstream side of the deflector plate, and wherein the aperture in the button is angled with respect to the center axis of the flow passage.

7. The concealed sprinkler according to claim 1, wherein said button defines an aperture that extends unobstructed all the way through the button from an upstream side to a downstream side of the deflector plate, and wherein the aperture in the button is split into multiple passages.

8. The concealed sprinkler according to claim 1, wherein said button defines an aperture that extends unobstructed all the way through the button from an upstream side to a downstream side of the deflector plate, and wherein an exit end of the aperture in the button is elongated in a lateral direction.

9. The concealed sprinkler according to claim 5, wherein the aperture in the button is tapered.

10. The concealed sprinkler according to claim 1, wherein the heat responsive trigger further comprises a lever bar having a threaded aperture receiving a set screw, said set screw being further received in a recessed cavity in an end of the button.

* * * * *